J. N. MAHONEY.
CIRCUIT INTERRUPTER.
APPLICATION FILED APR. 5, 1916.
1,305,142.
Patented May 27, 1919.
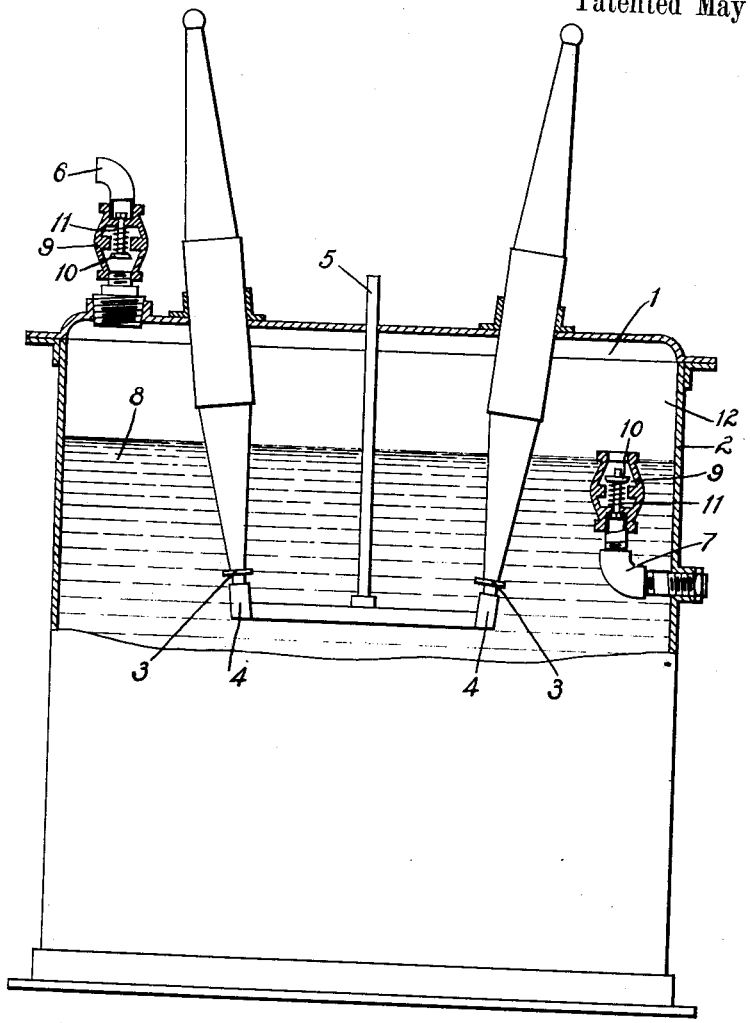
WITNESSES:
R. J. Fitzgerald.
J. H. Procter.
INVENTOR
Joseph N. Mahoney.
BY
Wesley G. Carr
ATTORNEY

UNITED STATES PATENT OFFICE.

JOSEPH N. MAHONEY, OF WILKINSBURG, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTER.

1,305,142. Specification of Letters Patent. Patented May 27, 1919.

Application filed April 5, 1916. Serial No. 89,103.

*To all whom it may concern:*

Be it known that I, JOSEPH N. MAHONEY, a citizen of the United States, and a resident of Wilkinsburg, in the county of Allegheny and State of Pennsylvania, have invented a new and useful Improvement in Circuit-Interrupters, of which the following is a specification.

My invention relates to oil-insulated circuit interrupters and particularly to means for providing ventilation and for preventing the expulsion of the insulating oil under predetermined conditions.

The object of my invention is to provide a valve device for a circuit interrupter of the above indicated character that shall have means for permitting the unobstructed ventilation of its oil-containing receptacle under normal conditions and for automatically closing the vent ducts or conduits of the oil-containing receptacle when the pressure therein increases to a predetermined value.

Heretofore, it was customary to protect the oil-containing receptacle of a circuit interrupter by the use of a baffled vent or conduit that permitted more or less free circulation of air in the receptacle under normal conditions and which tended to prevent the expulsion of the oil when the pressure increased. However, irrespective of the baffle plates in the air vent, oil was occasionally forced from the receptacle upon the opening of the circuit interrupter, and, because of the location of the baffled vent, only relatively light gases were permitted to escape from the receptacle under normal conditions.

In my device, I provide a plurality of vents or conduits and spring-actuated valves therefor that normally hold the vents open, but which, upon an increase in internal pressure, cause the vents to be closed to preclude the expulsion of the oil. I so dispose the vents that gases which are heavier or lighter than the air may freely pass from the receptacle under normal conditions.

The single figure of the accompanying drawing is a view, partially in elevation and partially in section, of a circuit interrupter that is provided with automatic ventilation-controlling means embodying my invention.

A circuit interrupter 1 comprises a receptacle 2, stationary contact members 3, movable contact members 4, an operating rod 5 and two vent pipes or conduits 6 and 7. The receptacle 2 is partially filled with oil 8 for the purpose of insulating the contact members 3 and 4.

The vent pipes or conduits 6 and 7 are severally provided with a valve 9 that comprises a piston 10 and a spring 11 for normally holding the piston in such position that air may circulate from the exterior of the receptacle 2, either upwardly or downwardly, through its upper portion 12 above the oil level. Thus, under normal conditions, any gas that may be contained in the upper portion 12 of the receptacle 2 may be permitted to escape through the one or the other of the vent pipes or conduits 6 and 7, according to the density of the gas.

When the contact members 3 and 4 are separated by any of the well known tripping means (not shown), the arcing between the same causes the pressure in the receptacle 2 to increase, and, if no means were provided for closing the vent pipes or conduits 6 and 7, some of the oil would be expelled from the receptacle 2. Therefore, the springs 11 are so adjusted that, when the pressure acting against them is increased to a predetermined value, the pistons 10 move against the action of the springs 11 to such positions that the valves 9 are effectively closed and the expulsion of the oil is precluded.

While I have shown a particular form of valve, it will be understood that my invention may be variously modified without departing from the spirit and scope of the same as set forth in the appended claims.

I claim as my invention:

1. In a circuit interrupter, the combination with a fluid-containing receptacle and coöperating contact members disposed in the fluid, of means disposed above the fluid in the receptacle for automatically connecting the upper portion of the receptacle to the outside atmosphere when the pressure within the receptacle is below a predetermined value.

2. In a circuit interrupter, the combination with a receptacle partially filled with a fluid, of a valve adapted to normally effect communication between the interior of the receptacle above the fluid and the exterior of the receptacle and to be automatically closed when the pressure in the receptacle reaches a predetermined value.

3. The combination with a receptacle partially filled with a fluid, of means adapted to normally effect communication between the interior and the exterior of the receptacle and for automatically interrupting the communication when the pressure in the receptacle reaches a predetermined value.

4. In a circuit interrupter, the combination with a closed receptacle partially filled with oil, and coöperating contact members immersed in the oil, of means for permitting air to circulate in the receptacle above the oil level only when the pressure therein is below a predetermined value.

5. In a circuit interrupter, the combination with a closed receptacle partially filled with oil, and coöperating contact members immersed in the oil, of a spring-actuated valve for permitting air to circulate in the receptacle above the oil level when the pressure in the receptacle is below a predetermined value.

6. In a circuit interrupter, the combination with a closed receptacle partially filled with oil, and coöperating contact members immersed in the oil, of a valve extending from the upper portion of the receptacle to permit the unrestricted circulation of air in the upper portion of the receptacle under predetermined conditions.

7. In a circuit interrupter, the combination with a closed receptacle partially filled with oil, and coöperating contact members immersed in the oil, of valves extending from the top and from the side of the receptacle to permit the unrestricted circulation of air in the upper portion of the receptacle under predetermined conditions and for preventing the circulation of air therein when the pressure rises to a predetermined value.

8. In a circuit interrupter, the combination with relatively movable coöperating contact members, and an oil-containing tank for the said contact members, of a pipe disposed in the upper portion of the tank and having a spring-restrained valve therein for preventing the expulsion of the oil when the contact members are separated.

9. The combination with a receptacle partially filled with a fluid, of a spring-actuated valve for permitting air to circulate in the receptacle above the fluid level when the pressure in the receptacle is below a predetermined value.

10. The combination with a receptacle partially filled with a fluid, of a valve for automatically permitting a gaseous medium to circulate in the receptacle above the fluid level when the pressure in the receptacle is below a predetermined value.

11. In a circuit interrupter, the combination with a receptacle partially filled with a fluid, of means for permitting air to circulate in the receptacle above the fluid level only when the pressure therein is below a predetermined value.

12. In a circuit interrupter, the combination with a receptacle partially filled with a fluid, of means for effecting communication between the portion of the receptacle above the fluid level and the outer air only when the pressure in the receptacle is below a predetermined value.

In testimony whereof, I have hereunto subscribed my name this 30th day of March, 1916.

JOSEPH N. MAHONEY.